United States Patent [19]

Bouzat

[11] Patent Number: 5,067,672
[45] Date of Patent: Nov. 26, 1991

[54] METHOD OF PLACING A GEOSTATIONARY TELECOMMUNICAITON SATELLITE IN ORBIT

[75] Inventor: Charles Bouzat, Ramonville, France
[73] Assignee: Alcatel Espace, Courbevoie, France
[21] Appl. No.: 514,063
[22] Filed: Apr. 24, 1990

[30] Foreign Application Priority Data

Apr. 24, 1989 [FR] France .................................. 89 05403

[51] Int. Cl.$^5$ .............................................. B64G 1/20
[52] U.S. Cl. .................................. 244/158 R; 244/165
[58] Field of Search .................... 244/164, 165, 158 R, 244/171, 172, 173, 169

[56] References Cited

U.S. PATENT DOCUMENTS 2,973,162  2/1961  Haeussermann ..................... 244/165
4,306,692  12/1981  Kaplan et al. ........................ 244/165
4,508,297  4/1985  Mouilhayrat et al. ............... 244/171

OTHER PUBLICATIONS

Briggs et al., Electrical Power Subsys. for INSAT-1 Conference "Energy to 21 Century" Aug. 18-22, 1980, pp. 1058-1063.

Primary Examiner—Galen Barefoot
Attorney, Agent, or Firm—Sughrue, Mion, Zinn, Macpeak & Seas

[57] ABSTRACT

A geostationary telecommunication satellite has a platform pointed towards the sun and a payload that is rotatable so as to point always toward the Earth. A method of placing this satellite in its final orbit entails using the inertia wheel of the satellite together with its sensors and possibly its two-axis rate gyro to secure attitude control of the satellite during the transfer, that is while in the transfer orbit and during the apogee burn.

8 Claims, 2 Drawing Sheets

METHOD OF PLACING A GEOSTATIONARY TELECOMMUNICAITON SATELLITE IN ORBIT

BACKGROUND OF THE INVENTION

1. Field of the Invention

The present invention concerns a method of placing a geostationary telecommunication satellite in orbit.

2. Description of the Prior Art

A telecommunication satellite is conventionally placed in its orbit (during the "pre-operational" phase) by a method comprising the following stages:

The launch vehicle injects the satellite into a transfer orbit; this intermediate orbit is elliptical and the launch vehicle injects the satellite into it substantially at the perigee.

Acquisition of the attitude for the apogee burn or maneuver; the apogee burn is carried out near the apogee of the transfer orbit in order to place the satellite in its final orbit which is a circular orbit with a radius substantially equal to the radius at the apogee of the transfer orbit.

The apogee burn or maneuver is performed near the apogee of the transfer orbit by firing the apogee thruster of the satellite.

When the final circular orbit is achieved (after one or more apogee maneuvers) the satellite "drifts" in this orbit until it reaches its final geostationary orbital position. It is not until this stage that the payload is rendered operational and the "operational phase" of the life of the satellite begins.

During the operational phase most current telecommunication satellites are stabilized relative to three axes by a fixed wheel providing a gyroscope function which enables indirect control of yaw by way of roll attitude control. Pitch control is achieved by varying the speed of the wheel. This minimal system provides a pointing accuracy which depends on the sensor used, on the value of the kinetic moment and on the resolution of the control torque. The accuracy may be improved by using supplementary devices such as magnetic coils, solar panels, inclined wheels or transverse reaction wheels, but this is to the detriment of weight and cost.

Most geostationary telecommunication satellites currently in orbit have a so-called north-south configuration in which the entire satellite, in other words the platform and the payload, is pointed permanently towards the Earth, the solar power generator being deployed and oriented along the axis perpendicular to the orbit and the solar panels turning about their longitudinal axis so as to point towards the sun at all times. In a configuration of this kind the axis of the momentum wheel is perpendicular to the thrust vector when the apogee thruster is fired. The momentum wheel must therefore not be rotating during the apogee maneuver.

There is described in the literature, for example in the document FR-A-2472509, another configuration which uses a satellite platform and solar panels pointed towards the sun at all times and a payload which is rotatably mounted on the platform so that it points towards the Earth at all times. This requires that the payload be entirely disposed on a north or south face perpendicular to the launch vehicle axis in the launch configuration. In this case the axis of the momentum wheel is aligned with the thrust imparted by the apogee thruster.

With the first of these configurations, which is that of most geostationary satellites currently in orbit, there are two main methods for stabilizing the satellite when it is moved from the transfer orbit to the final orbit.

The so-called "spin transfer" method entails injecting the satellite into its transfer orbit in such a way that it rotates (spins) about the axis of the apogee thruster. The successive phases of this method are as follows, for example:

the satellite is injected by the launch vehicle into a rotating attitude with the following characteristics:
attitude precision less than 6°,
transverse angular speed less than 2°/second,
spin speed approximately 5 revolutions/minute,
the stabilizing system is powered up, the antennas are deployed and the spin speed is increased to 13 revolutions/minute,
the attitude and the spin speed are determined by telemetry using the terrestrial and solar elevation sensor,
the spin axis is reoriented before each apogee maneuver,
one or more apogee maneuvers are performed,
the spin speed is reduced,
the solar acquisition is performed and the solar generators are deployed,
the final attitude is acquired.

A method of this kind, which is very secure given the rotation imparted to the satellite when it is moved from the transfer orbit to its final orbit, has the advantage of minimizing the attitude maneuvers and the equipment required for final orbit injection. On the other hand, the effects of liquid tossing (fuel and combustion-supporting liquid) are difficult to control and model given the large quantities of propellants on the satellite. Also, this "spin" configuration has the disadvantage of imposing constraints regarding the inertia ratio and problems with laying out and balancing the satellite to meet the stability criteria.

The so-called "three-axis stabilized transfer method" entails injecting the satellite into its transfer orbit with a three-axis stabilized attitude and using dedicated equipment to control orientation throughout the transfer. The successive phases of a method of this kind are, for example:

the satellite is injected by its launch vehicle into a three-axis attitude with an attitude precision in the order of 3°, virtually no angular speed in the required attitude and with the solar generator facing towards the sun,
calibration of rate gyro drift, solar acquisition, terrestrial acquisition, rotation through 360° about each axis for fine calibration of the rate gyros,
the solar generator is pointed towards the sun,
the rate gyros are calibrated again (having drifted in the meantime),
the apogee burn attitude is acquired,
the apogee maneuver is performed (one or more times), controlled by the rate gyros,
sun acquisition and deployment of the solar generator,
nominal attitude acquisition.

This second method has the disadvantage of not offering the inherent stabilization security of the spin transfer method (in the event of an equipment failure, for example). Also, it requires equipment specific to transfer of the satellite from its transfer orbit to its final orbit, including:

a sophisticated solar sensor with multiple optical heads, an infra red terrestrial sensor, and
a three-axis integrating rate gyro assembly.

As a result it is complex and costly.

Another disadvantage of these known methods is that they are not autonomous and require significant ground support.

The invention is directed to remedying these disadvantages.

SUMMARY OF THE INVENTION

The present invention consists in a method of placing a geostationary telecommunication satellite in orbit comprising the following successive phases:

injection of the satellite by the launch vehicle into a transfer orbit;

acquisition of the apogee burn attitude near the apogee in order to place the satellite in its final orbit;

execution of the apogee burn or maneuver;

when the final orbit is reached, after one or more apogee burns: drifting of the satellite in this orbit until it reaches its final orbital position, in which method, the satellite having a configuration comprising a platform pointed at all times towards the sun and a payload that can be steered relative to the platform and is pointed at all times towards the Earth:

the satellite is injected into its transfer orbit in a three-axis stabilized attitude substantially corresponding to the apogee maneuver attitude;

the orientation control device normally equipping the satellite is powered up;

the solar acquisition operation is carried out;

after aiming errors are eliminated, the momentum wheel normally included in the satellite is run up to speed, the rotation axis of the momentum wheel being aligned with the thrust axis of the apogee thruster, because of the aforementioned configuration adopted for the satellite, to a speed sufficient to obtain sufficient gyroscopic stiffness;

the solar generator is at least partly deployed;

orientation with respect to the three axes is commanded, with the angular speeds eliminated by reducing the nutation;

the apogee maneuver is prepared by, knowing the attitude of the satellite, orienting the kinetic moment of said momentum wheel with the apogee burn axis;

the apogee burn is carried out near the apogee of the transfer orbit with the satellite orientation controlled during the apogee burn; and when the final orbit is achieved, after one or more apogee burns, the satellite is allowed to drift in the conventional way to its final orbital position.

Said three-axis orientation control is advantageously effected by means of a two-axis solar sensor normally fitted to the satellite for use on station.

In a first embodiment the apogee maneuver preparation is effected using, to obtain the attitude reference of the third axis near the solar direction, the sensors normally included in the satellite payload, such as star or terrestrial sensors.

In another embodiment the apogee maneuver preparation is effected using a two-axis rate gyro of the satellite and, to obtain the attitude reference of the third axis near the solar direction, a specific maneuver entailing rotating the satellite 90° about the kinetic moment of the wheel, said rotation being governed by a gyroscopic reference, which results in an interchange of the axes transverse to the momentum wheel and makes it possible to obtain the attitude reference by optical means, for example a supplementary optical head orthogonal to that normally used on station or a semi-reflecting mirror inclined at 45° in front of the optical head of the sensor normally used on station.

The invention will be better understood and its other characteristics and advantages will emerge more clearly from the following description given by way of non-limiting example only with reference to the appended diagrammatic drawings.

BRIEF DESCRIPTION OF THE DRAWINGS

FIG. 3 is a diagram explaining one method of apogee maneuver preparation.

DETAILED DESCRIPTION OF THE INVENTION

Figure 1:
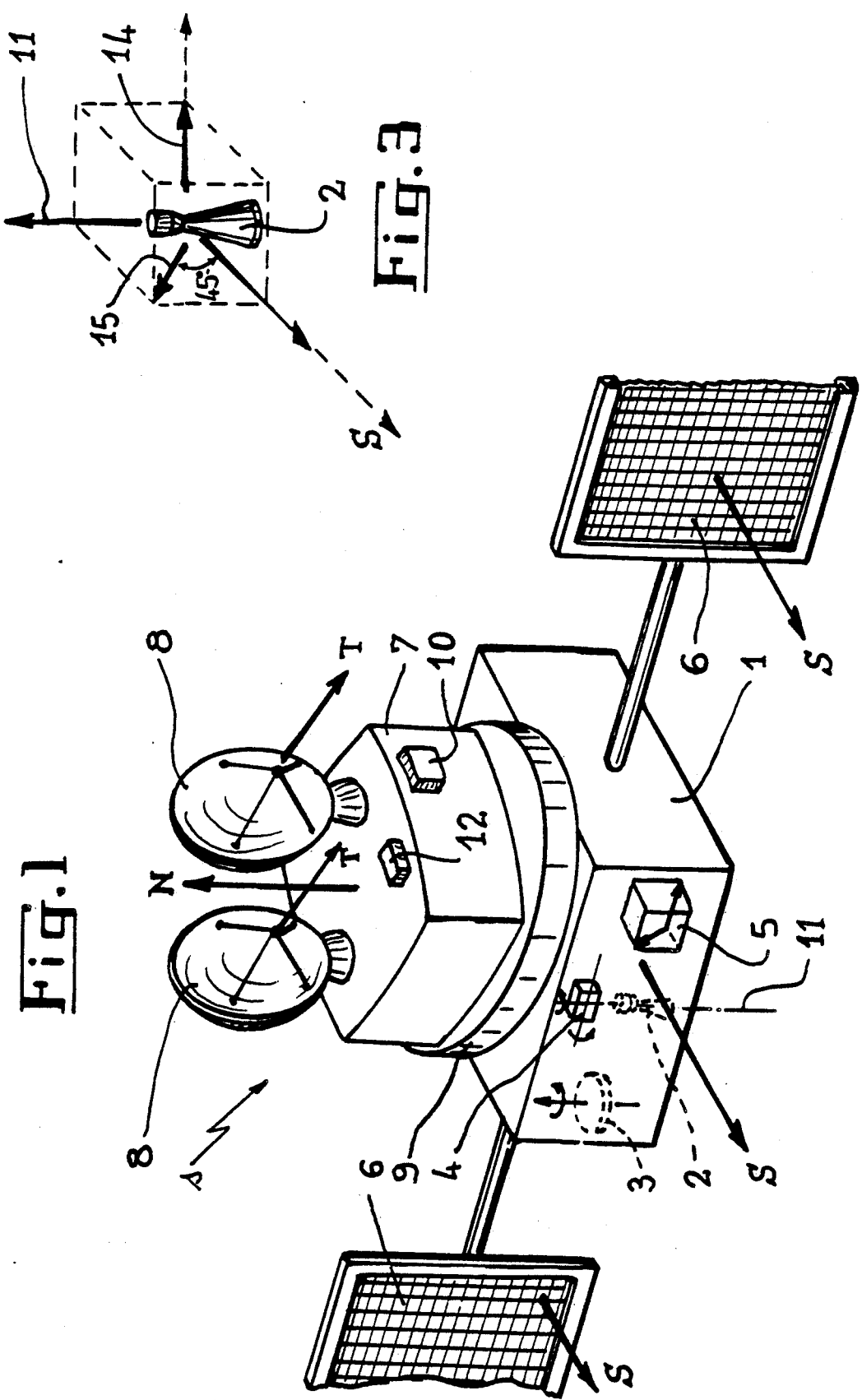
FIG. 1 is a schematic representation of the configuration used for a telecommunication satellite.

Referring to FIG. 1, the geostationary telecommunication satellite comprises:

a platform 1 carrying thrusters, in particular the apogee thruster 2, a momentum wheel 3, a two-axis solar sensor 4 and a "dry gyroscope" type two-axis integrating rate gyro 5; it also carries the solar generator with two deployable solar panels 6; and a payload 7 comprising all of the radiocommunication parts including the antennas 8 and which is fixed to a turntable 9 mounted on the platform 1; in most cases the payload includes at least one infra red terrestrial sensor 10 and/or at least one star sensor 12.

With this type of configuration, when the satellite is on station the platform 1 and the solar panels 6 are permanently pointed in the direction S towards the sun and the turntable 9 rotates continuously so as to keep the payload 7 pointed at all times in the direction T towards the Earth (the payload 7 therefore rotates once a day relative to the sun). This requires that the payload be entirely disposed on a north or south face (the north face N in this example) which is perpendicular to the axis of the launch vehicle 11 (the axis of the apogee thruster 2) in the launch configuration. The axis of the momentum wheel 3 is therefore aligned with the thrust produced by the apogee thruster 2 in this configuration.

It follows that the momentum wheel 3 can be put into rotation before and during the apogee maneuver, in other words in the transfer orbit, which makes it possible not only to stabilize the attitude of the satellite during the transfer but also, in most cases, to avoid the need for the satellite to include equipment specific to the transfer orbit.

In other words, in order to benefit from at least some of the advantages of the spin transfer method without suffering from its disadvantages the invention proposes to substitute for the kinetic moment obtained by rotating the satellite an internal kinetic moment provided by the momentum wheel. This concept makes it possible to use the momentum wheel operating during the operational phase. Associated, for example, with a solar sensor used also on station and with the orientation control thrusters, this system makes it possible to maintain the attitude of the satellite precisely during the maneuver preparation phases. A system of this kind is therefore simple, reliable and inexpensive and in most cases it does not use any dedicated equipment.

Figure 2:
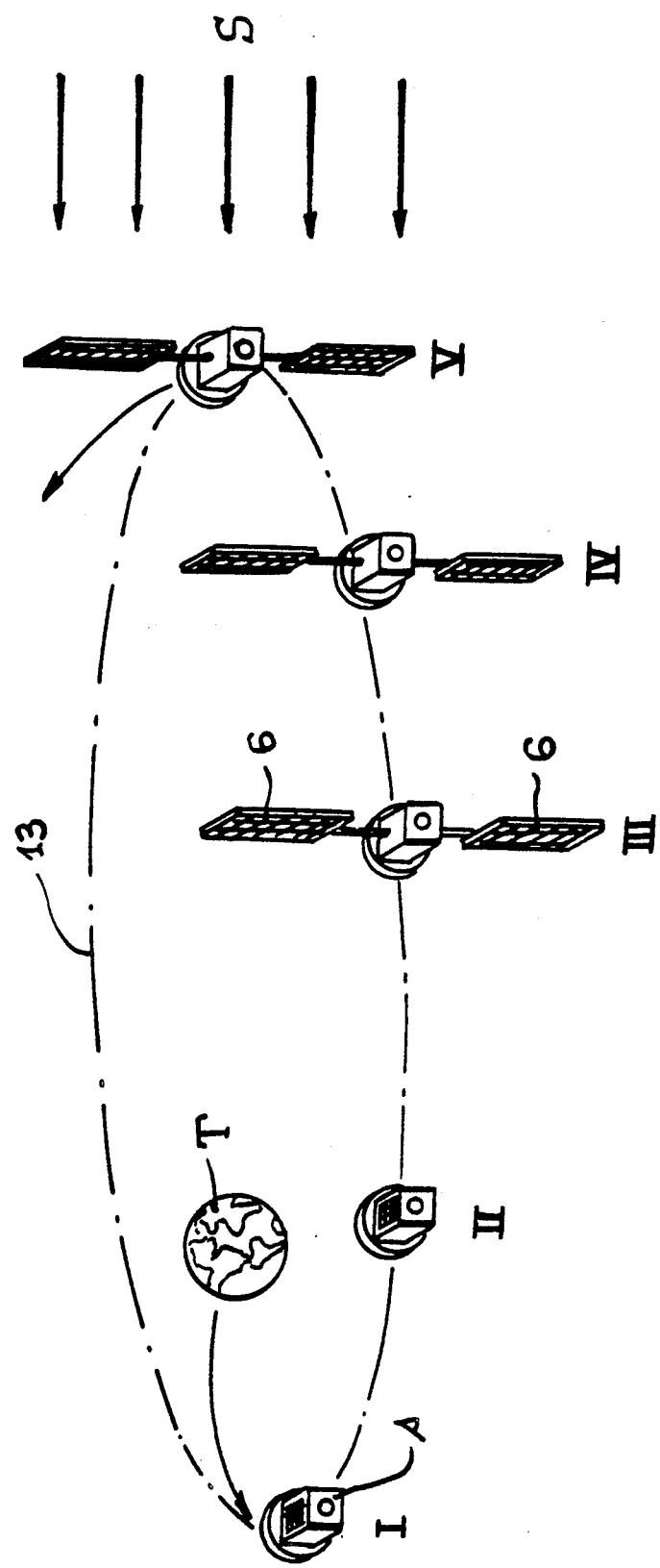
FIG. 2 shows the main transfer stages.

Referring now to FIG. 2, showing the earth T and the geostationary transfer orbit 13, the successive transfer phases whereby the satellite is transferred from the transfer orbit to its final orbit are as follows:

I - The satellite is injected by the launch vehicle into its transfer orbit 13 with a three-axis stabilized attitude corresponding to the apogee maneuver attitude, ignoring launch vehicle orientation errors.

II - The satellite's attitude control device is powered up and spins the momentum wheel 3 fast enough to obtain sufficient gyroscopic stiffness (typically 50 Nms, for example).

III - When this has been achieved (in 700 seconds maximum), the order to deploy the solar generator 6 is transmitted which makes it possible to limit the discharge of the batteries to 20% for a usable charge of 3 000 Ah, for example; the attitude is then stabilized with respect to the three axes by means of the two-axis solar sensor 4 normally used on station, the angular speeds being eliminated in the conventional way by reducing the nutation; given a wide-angle solar sensor measurement accuracy of 0.05°, the attitude with respect to the axis near the solar direction can be maintained with an accuracy better than 0.5°.

IV - Apogee maneuver preparation: knowing the attitude of the satellite, the kinetic moment of the momentum wheel 3 is oriented according to the apogee burn axis.

To prepare the apogee maneuver it is necessary to orient the kinetic moment of the momentum wheel 3 in the required direction by optimizing the speed increment during the apogee burn. This requires the attitude reference of the third axis near the solar direction to be obtained, which can be done in two ways:

using sensors of the payload 7, such as the star sensor 12 or the terrestrial sensor 10; this is a simple solution, especially as the momentum wheel orientation error is limited to a few degrees, and consequently simplifies the star recognition process; or (FIG. 3) using the two-axis (14, 15) gyroscope 5 (the axis 15 is at 45° to the solar direction) and by performing a specific maneuver entailing rotation through 90° about the kinetic moment using a gyroscopic reference. This results in an interchange of the axes transverse to the momentum wheel 3 and makes it possible to obtain the attitude reference either using a supplementary optical head orthogonal to that used on station or a semi-reflecting mirror inclined at 45° in front of the optical head of the sensor used on station (sunlight passes through this mirror in a direct position and is reflected from it in an orthogonal position, which makes it possible to use the solar sensor normally fitted to the satellite to obtain this attitude reference). In the initial inertial attitude the two-axis integrating rate gyro 5 can be calibrated, the inclined configuration shown in FIG. 3 enabling calibration of both axes because the axis 15 is inclined at 45° to the solar direction S.

As its attitude is known, the satellite can be precisely aligned with the thrust axis for the apogee burn using the thrusters.

V - The apogee burn is conducted (for about one hour) from just before to just after the apogee of the orbit 13, using the apogee thruster 2. The final circular orbit is usually achieved after a number of apogee maneuvers of the same kind.

During this apogee maneuver the gyroscopic stiffness due to the inertia wheel 3 is not sufficient to withstand the torque due to the apogee thruster. The attitude is therefore stabilized either using the sensor(s) of the payload as previously mentioned (12, 10) or using the previously mentioned two-axis rate gyro 5.

VI - In this phase (not shown in the drawings), when the final circular orbit is achieved (usually after several apogee maneuvers each lasting approximately one hour and each carried out near the apogee of the transfer orbit), the satellite is conventionally allowed to "drift" until it reaches its final orbital position.

In most cases a transfer attitude control system of this kind does not require any dedicated equipment because:

the momentum wheel and the solar sensor are already provided for aiming the platform in the operational phase, the infra red terrestrial or star sensor is already used for aiming the payload, the two-axis rate gyro may also be used for stationkeeping to maintain the pointing accuracy.

Finally, the satellite configuration based on an inertial platform pointed towards the sun makes it possible to design an orientation control system based on minimum hardware which is as simple and reliable as a spin transfer system while avoiding the constraints relating in particular to the effects of liquid tossing and to the mass and inertia characteristics.

It goes without saying that the invention is not limited to the embodiment that has just been described but may be implemented in numerous other variant modes.

There is claimed:

1. In a method of placing a geostationary telecommunication satellite having a steerable payload mounted on a platform in a circular final orbit comprising the following successive steps:

injecting the satellite in a three-axis stabilized attitude substantially corresponding to an apogee maneuver attitude into an elliptical transfer orbit;

powering up an inertia momentum wheel;

eliminating aiming errors;

preparing for apogee maneuver into the circular orbit by powering up the inertia momentum wheel with the rotation of the axis of the momentum wheel aligned with the thrust axis of an apogee thruster to a speed sufficient to obtain gyroscopic stiffness;

pointing a configuration comprising said platform at all times towards the sun and steering said payload on said platform at all times pointed towards the earth;

at least partially deploying the solar panels of a solar generator;

eliminating angular speeds by reducing the nutation;

carrying out at least one apogee burn near the apogee of the transfer orbit with the satellite orientation controlled during the apogee burn to obtain final circular orbit; and when the final circular orbit is achieved, after one or more apogee burns, allowing the satellite to drift in the conventional way into its final orbital position.

2. Method according to claim 1, wherein said step of three-axis orientation of the satellite includes operating a two-axis sensor normally equipping the satellite.

3. Method according to claim 1, wherein said step of preparing said satellite for apogee maneuver includes obtaining a third axis attitude reference near the solar direction of the sun by at least one of a star sensor and a terrestrial sensor.

4. Method according to claim 1, wherein said step of preparing said satellite for an apogee maneuver includes using a two-axis rate gyro of the satellite and obtaining an attitude reference of a third axis near the solar direction of the sun by rotating the satellite through 90° about the kinetic moment of the inertia momentum wheel resulting in an interchange of the axes transverse to the inertia momentum wheel and by optically obtaining the attitude of the third axis of the satellite.

5. Method according to claim 4, wherein said step of optically obtaining a third axis attitude of the satellite comprises using a supplementary optical head orthogonal to an optical head normally used by the satellite on station.

6. Method according to claim 4, wherein said step of optically obtaining a third axis attitude of the satellite comprises using a semi-reflecting mirror inclined at 45° in front of a normal optical head of a sensor of the satellite used by the satellite on station.

7. Method according to claim 1, wherein the step of preparation for the apogee burn includes using at least one payload sensor.

8. Method according to claim 1, wherein the step of obtaining three-axis orientation of the satellite during the step of preparing for the apogee maneuver into the circular orbit includes using a two-axis rate gyro of the satellite.

* * * * *